(12) United States Patent
Bashev et al.

(10) Patent No.: US 11,803,313 B2
(45) Date of Patent: Oct. 31, 2023

(54) METHOD OF CONSTRUCTING A FILE SYSTEM BASED ON A HIERARCHY OF NODES

(71) Applicant: LIMITED LIABILITY COMPANY "PEERF", Moscow (RU)

(72) Inventors: Vladimir Nikolaevich Bashev, Nizhny Novgorod (RU); Nikolay Olegovich Ilyin, Moscow (RU)

(73) Assignee: LIMITED LIABILITY COMPANY "PEERF", Moscow (RU)

( * ) Notice: Subject to any disclaimer, the term of this patent is extended or adjusted under 35 U.S.C. 154(b) by 411 days.

(21) Appl. No.: 17/038,051

(22) Filed: Sep. 30, 2020

(65) Prior Publication Data

US 2021/0096758 A1 Apr. 1, 2021

(30) Foreign Application Priority Data

Oct. 1, 2019 (RU) ............................ RU2019130830

(51) Int. Cl.
*G06F 3/06* (2006.01)
*G06F 12/02* (2006.01)
*G06F 16/17* (2019.01)

(52) U.S. Cl.
CPC .......... *G06F 3/0643* (2013.01); *G06F 3/0604* (2013.01); *G06F 3/067* (2013.01);
(Continued)

(58) Field of Classification Search
CPC .. G06F 16/1727; G06F 3/0604; G06F 3/0644; G06F 3/067; G06F 12/0223; G06F 2212/1012; G06F 2212/154; G06F 3/0643
See application file for complete search history.

(56) References Cited

U.S. PATENT DOCUMENTS 6,073,158 A * 6/2000 Nally .................. G06F 15/7842
710/24
6,728,735 B1 * 4/2004 Fong .................. G06F 11/1471
707/642

(Continued)

FOREIGN PATENT DOCUMENTS

| EP | 0 629 960 | 5/2000 |
| KR | 10-0754306 | 9/2007 |
| RU | 2 574 824 | 2/2016 |

*Primary Examiner* — Irete F Ehichioya
*Assistant Examiner* — Huen Wong
(74) *Attorney, Agent, or Firm* — Nixon & Vanderhye PC (57) ABSTRACT

This invention relates to computer engineering and operating system components, in particular, it discloses a new method of building a hierarchal file system, which provides new functionality and flexibility, including: unlimited maximum possible file system size (number of elements), unlimited size of a single element, unlimited types of data, that can be represented as a file. In addition, the disclosed file system allows for user-defined types of data and can be used as a registry for OS system components, saving space important for resource-restricted embedded systems. The minimum file system size is 2 Bytes only. File system supports empty or non-unique files naming and natively provides built-in security using specification-based nodes header encoding. This result is achieved by using file systems nodes metadata comprising: the unique identifier (ID), an ASN.1 header with PER encoding, and a doubly linked list of logical blocks of its data. ID is of Unlimited Integer type and consist of 2 parts: preamble (extension bit) and Integer number. Nodes of a special types, for example, system nodes or nodes with new types defined by the developers of OS or related file system manager component, can utilize a special delegated processing. When reading and decoding a header of a node of a non-standard type, the file manager or utilities delegate (Continued)

processing of the node to a custom component that knows how to process this type of node.

17 Claims, 8 Drawing Sheets

(52) U.S. Cl.
CPC ........ *G06F 3/0644* (2013.01); *G06F 12/0223* (2013.01); *G06F 16/1727* (2019.01); *G06F 2212/1012* (2013.01); *G06F 2212/154* (2013.01)

(56) References Cited

U.S. PATENT DOCUMENTS

| | | | | |
|---|---|---|---|---|
| 8,407,265 | B1* | 3/2013 | Scheer | G06F 16/1727 711/170 |
| 9,104,675 | B1* | 8/2015 | Clark | G06F 16/10 |
| 10,482,065 | B1* | 11/2019 | Armangau | G06F 16/1748 |
| 10,936,538 | B1* | 3/2021 | Unger | G06F 16/11 |
| 11,151,094 | B1* | 10/2021 | Yang | G06F 16/128 |
| 2003/0065780 | A1* | 4/2003 | Maurer, III | G06F 11/1456 709/225 |
| 2003/0158861 | A1* | 8/2003 | Sawdon | G06F 11/2094 |
| 2003/0182325 | A1* | 9/2003 | Manley | G06F 11/2066 714/E11.107 |
| 2011/0004630 | A1* | 1/2011 | LaBerge | G06F 16/185 707/693 |
| 2012/0011176 | A1* | 1/2012 | Aizman | G06F 16/183 707/822 |
| 2015/0269203 | A1* | 9/2015 | Baldwin | G06F 16/2228 707/741 |
| 2022/0050819 | A1* | 2/2022 | Donnelly | G06F 16/182 |

* cited by examiner

METHOD OF CONSTRUCTING A FILE SYSTEM BASED ON A HIERARCHY OF NODES

CROSS-REFERENCE TO RELATED APPLICATIONS

This application also claims the benefit of Russian Patent Application 2019130830 filed on Oct. 1, 2019. The content of the abovementioned application is incorporated by reference herein.

TECHNICAL FIELD

The present technical solution relates to the field of computing, in particular, to a method of building a file system based on a hierarchy of nodes.

BACKGROUND

Currently there are a large number of solutions describing file systems.

File systems determine how data is stored. They determine what restrictions the user will face, how fast read and write operations will be, and how long the drive will work without failures. Known in the art is the NTFS (New Technology File System) file system, a standard file system for the Microsoft Windows NT family of operating systems. NTFS supports metadata and uses specialized data structures to store information about files to improve performance, reliability, and disk space efficiency. NTFS stores information about files in the Master File Table (MFT). NTFS has built-in capabilities to differentiate access to data for different users and user groups—Access Control Lists (ACL), and also to assign quotas (restrictions on the maximum amount of disk space occupied by certain users). NTFS uses the USN journaling system to improve the reliability of the file system.

This file system has limited cross-platform compatibility.

A file system FAT32 is known from the prior art. However, this file system has file and partition size limitations. FAT32 is not designed for storing large amounts of data and installing heavy applications.

There is also known a solution that describes a method for implementing an extensible file system LICENSE, LLC, publ. Oct. 2, 2016.

Also known is a distributed file serving system that provides a distributed file serving architecture with virtualized storage of metadata (KR100754306B1 (INTERNATIONAL BUSINESS MACHINES CORPORATION, publ. Mar. 9, 2007.

From patent EP0629960B1 (SUN MICROSYSTEMS INC, publ. May 24, 2000.) the architecture of extensible file systems is known. The known architecture allows extending the functionality of the file system by installing (or creating) new file systems (layers) on top of existing file systems. However, prior art solutions describing file systems have limited functionality, in particular:

Limitations on the maximum size of the file system, the number of elements;
Limitations on the maximum file size;
Restrictions on the type of data that can be presented as a file, including the use of the file system as a registry of OS system components.

SUMMARY OF THE INVENTION

The disclosed technical solution is aimed at eliminating the disadvantages inherent in existing solutions from the prior art.

The technical problem to be solved by the claimed technical solution is the creation of a new computer-implemented method for constructing a file system based on a hierarchy of nodes, which is described in an independent claim. Additional embodiments of the present invention are presented in the dependent claims.

The technical result to which the claimed technical solution is directed, is the use of a unique identifier of the file system node, which in turn for the operating system components coincides with the unique identifier of the component. Thus, the file system simultaneously represents a kind of registry for components, in which components are searched and accessed directly without an additional presentation layer. This approach is especially effective for devices with a small amount of RAM, for which it is critical to use small volumes of registries loaded into memory.

In the claimed solution, the search for components is performed by the UGUID in the file system itself, since the UGUID coincides with the ID of the system-type node.

Additional flexibility of the claimed solution is that in the root or in the directory of the file system there can be several files or directories with the same names, as well as files that do not contain names, and this will not be a conflict at the file system level.

Another positive effect of this solution is the reduced size of the file system node, in which the header describing the type of file system element can be empty, and such a node consists only of a unique node identifier, an empty header, and data, which is also relevant on devices with limited resources. Thus, the most minimal file system hierarchy is allowed, consisting only of the root node and several nodes of system components, for which the header is empty, i.e. does not require encoding and decoding, and access to components is carried out by their system identifier.

In a preferred embodiment, a computer-implemented method for building a file system based on a node hierarchy executed by a computing device is claimed, comprising the steps of:

A physical medium or its partition is formatted by creating an initial (root) node of the file system to which a unique identifier (ID) is assigned, wherein a record of the number, size and addressing of logical blocks (LBA) of a given carrier is formed in the root node;

on a formatted physical medium or its partition, according to the information contained in the root node, the presence of free logical blocks sufficient for expanding existing nodes or placing a new node is checked;

a new file system node containing a unique identifier, an ASN.1 header with PER encoding, and a doubly linked list of logical blocks of its data is created using the following actions:

based on the input data, including the type of the new node, the parent node is searched for by traversing the tree of nodes of the file system with decoding of the nodes headers, where necessary;

it is determined whether the new node is a special type with additional requirements (for example, the system type node ID is the system UGUID), and if so, these requirements apply;

if the ID of the new node is not indicated, then a node with a new ID is created if the node ID is indicated, then the node is searched and after it is found, then a rewriting (update) of the node is performed, or a new node with the specified ID is created.

In a particular embodiment, the format of a unique file system node identifier (ID) consists of two parts: a preamble and an Integer, and is an unlimited Integer.

In another embodiment, the file system is hierarchical and has a tree structure.

In another particular embodiment, a special type of node are system nodes, for which the unique ID corresponds to the unique UGUID of the system component, and which form a linked list on the file system.

In another embodiment, the node header is not fixed in size and can be expanded.

In another particular embodiment, the header may include a new user-defined node type, and the node may contain data of the appropriate type.

In another embodiment, a node with the directory type may contain other nodes of the directory type and nodes of the file type with the same names.

In another embodiment, each logical block used by a node has a record of the number of the previous logical block and the number of the next logical block for organizing a doubly linked list, which in turn will allow creating/inserting/moving/deleting logical blocks in a doubly linked list.

In another embodiment, a logical block in which the record of the number of the previous logical block is equal to the number of the logical block itself, i.e. points to itself, is the initial logical block of the node.

In another embodiment, a logical block in which the record of the number of the next logical block is equal to the number of the logical block itself, i.e. points to itself, is the terminating logical block of the node.

In another embodiment, there is a system, comprising at least one processor;
    at least one memory, which contains machine-readable instructions which, when executed by the at least one processor, are effective in executing a file system via method described above.

Another embodiment of the invention is a computer readable data storage medium containing a file system created and executed by the method described above.

Another embodiment of the invention is a data storage system, comprising a plurality of interconnected computer device nodes, each of which has access to a plurality of storage mediums to access and process file system object data via the method described above.

BRIEF DESCRIPTION OF THE DRAWINGS

The implementation of the invention will be described in the following in accordance with the accompanying drawings, which are presented to clarify the essence of the invention and in no way limit the scope of the invention. The following drawings are attached to the application.

DETAILED DESCRIPTION OF THE INVENTION

In the following detailed description of an implementation of the invention, numerous implementation details are set forth to provide a thorough understanding of the present invention. In view of the fact that specialists in the field of designing operating and computer systems are familiar with the commonly used terms, components and procedures, these methods, names and components have not been described in detail so as not to obscure the features of the present invention and the distinctive possibilities of its use.

Furthermore, it will be apparent from the foregoing that the invention is not limited to the illustrated embodiment. Numerous possible modifications, changes, variations, and substitutions that retain the spirit and form of the present invention will be apparent to those skilled in the art. The present invention is directed to a computer-implemented method for constructing a file system based on a hierarchy of nodes.

In the claimed solution, the file system architecture is based on the use of a unique file system node identifier.

The format of the unique identifier of the file system node consists of two parts: the preamble and the Integer itself.

The minimum format size is 2 Bytes of information (Byte is a unit of measurement according to GOST 8.417-2002 and ISO/IEC 2382:2015). The maximum format size tends to infinity, the limitation is the hardware properties of computing technique.

The minimum size of the preamble is one Byte. The preamble cannot be null. The preamble consists of two parts: an extension bit and an Integer' length in Bytes. When the preamble bit fields are overflowed by the length of an Integer, the extension bit is shifted to the right, increasing the preamble size by one Byte. Thus, the size of the preamble tends to infinity, thereby increasing the bit fields to specify the length of the Integer in Bytes. As a result, by increasing the setting of the length of the size of an Integer, the Integer also tends to infinity.

Figure 1:
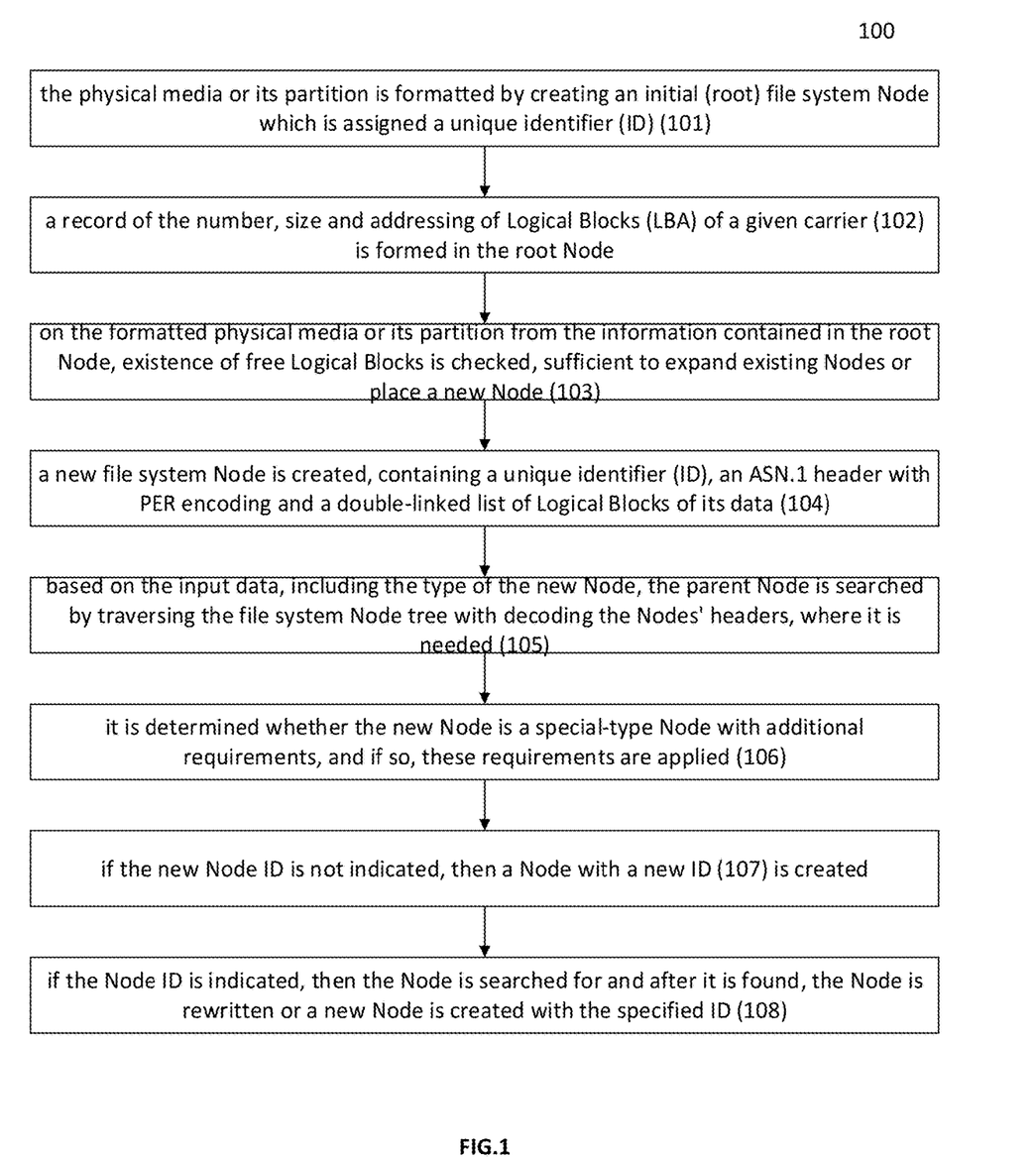
FIG. 1 illustrates a computer-implemented method.

FIG. 1 Illustrates a computer-implemented method (100) of building a file system based on a node hierarchy executed by a computing device.

In step (101), the physical medium or its partition is formatted by creating an initial (root) file system node, which is assigned a unique identifier (ID). At the same time, at step (102), a record is generated in the root node about the number, size and addressing of logical blocks (LBA) of this medium.

Further, at step (103), on the formatted physical medium or its section, according to the information contained in the root node, the presence of free logical blocks sufficient to expand existing nodes or accommodate a new node is checked.

At step (104), a new file system node is created containing a unique identifier, an ASN.1 header with PER encoding, and a doubly linked list of logical blocks of its data, using the following actions:

At step (105), based on the input data, including the type of the new node, the parent node is searched for by traversing the file system node tree, decoding the node headers where necessary. For example, system nodes do not require decoding and are identified by their unique UGUIDs.

At block 106, it is determined if the new node is a special type of node with additional requirements, and if so, these requirements apply.

Nodes of a special type are, for example, system nodes or nodes with new types, which have been defined by the developer of the operating system or file system manager component with which the file system is used. Component architecture allows for delegated processing. For example, when reading and decoding a header of a node of a non-standard type (i.e., a type defined by the developer), the file manager or utilities working with the file system delegate processing of the node to a custom component that knows what type of node it is and how to process it. If the system for the file manager does not have an appropriate component capable of processing a given node, the system may display it as unknown or request the installation of a necessary component to process unknown types of nodes.

In step 107, if no new node ID is specified, a node with a new ID is created. In step 108, if a node ID is specified, then the node is searched for and, after finding it, the node is overwritten (updated) or a new node with the specified ID is created.

Figure 2:
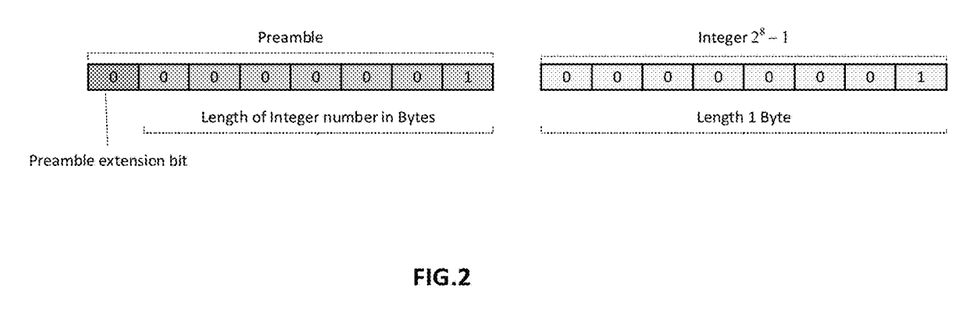
FIG. 2 illustrates the Unlimited Integer data type.

The architecture of the file system is based on the use of a unique identifier of the file system node, which has the data type Unlimited Integer, the format of which is shown in FIG. 2.

The format of the unique identifier of the file system node consists of two parts: the preamble and the Integer itself. The minimum format size is two Bytes. The maximum format size tends to infinity, the limitation is the hardware properties of computing technology. The minimum size of the preamble is one Byte.

The preamble cannot be null. The preamble consists of two parts, the extension bit and the length of an Integer in Bytes. When the preamble bits overflow—the length of an Integer, the extension bit is shifted to the right, increasing the preamble size by one Byte.

Figure 3:
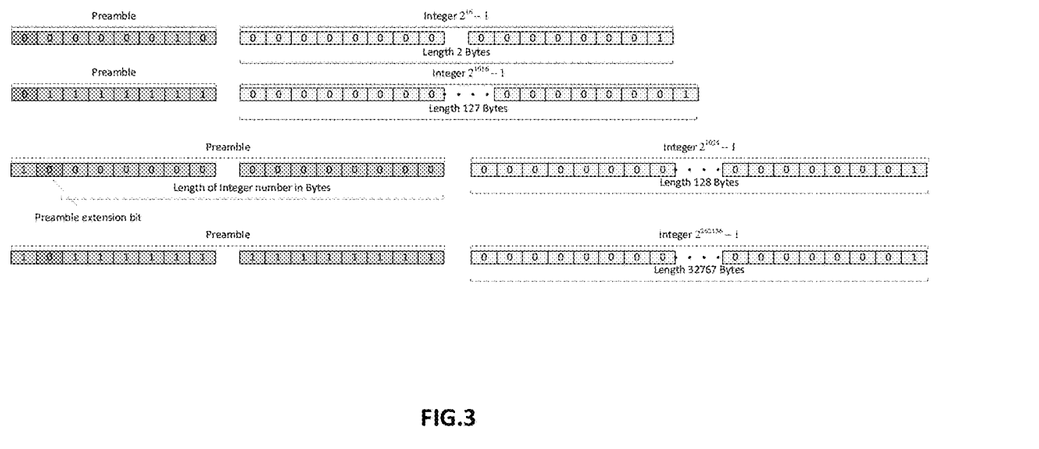
FIG. 3 illustrates an example of expanding an Unlimited Integer Number, the examples represent a number having the same value equal to one.

Thus, the size of the preamble tends to infinity, thereby increasing the bit fields to specify the length of the Integer in Bytes. As a result, by increasing the setting of the length of the size of an Integer, the Integer also tends to infinity. Examples of format expansion are shown in FIG. 3.

Figure 4:
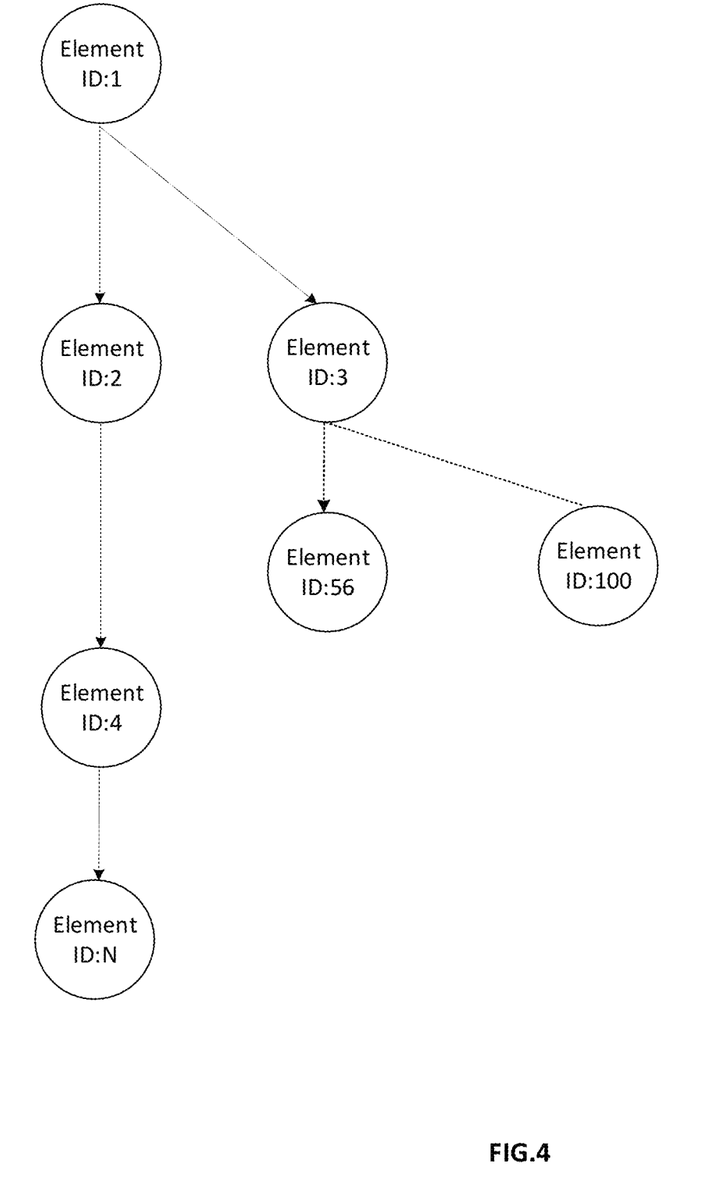
FIG. 4 illustrates a filesystem tree.
Figure 5:
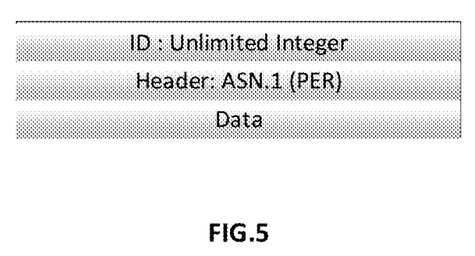
FIG. 5 illustrates a file system element.

The hierarchy of the file system is shown in FIG. 4, it consists of the elements of the file system. Each element of the file system is a tree node of the hierarchical file system and consists of three parts of FIG. 5:

ID—The unique identifier for the file system node is used in Unlimited Integer format.

Header—Describes the node type of the file system in ASN.1 using PER encoding. The full description of the header is described by the specification, and the header can be empty.

Data is a doubly linked list of data blocks for this node.

Figure 6:
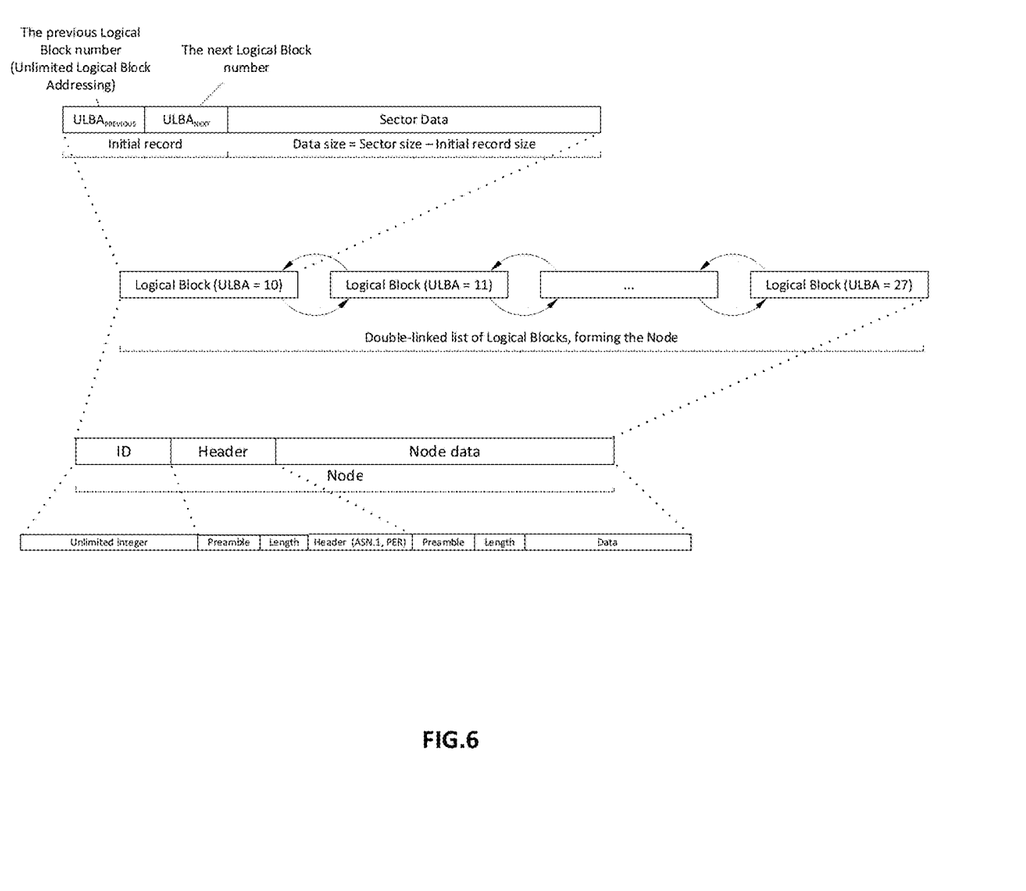
FIG. 6 illustrates an expanded view of a file system item.

FIG. 6 shows an expanded view of a file system element, below are explanations for this figure:

The file system architecture uses the modern logical block addressing (LBA), for the old addressing system (CHS), it is necessary to use the translation rules to obtain the block address in LBA mode set by the X3T10 technical committee. Due to the fact that the standardization committee is constantly increasing the LBA addressing capacity, which in turn is due to the growth of the disks size, the LBA block number is specified using the data type.

By using the Unlimited Integer of FIG. 2 as the LBA addressing, the file system is not limited in size (number of logical blocks). For the first block LBA=0, in Unlimited Integer format, the first block will be written as 0x010100h.

Physical node data is a doubly linked list of logical LBAs. In this case, the node itself consists of an identifier, a header and data, which are placed in this doubly linked list of logical blocks (the logical blocks themselves can have different sizes 512 Bytes, 1024 Bytes . . . ).

Each logical block LBA used by a node has an initial record of the number of the previous block and the number of the next block for organizing a doubly linked list, which in turn will allow creating/inserting/moving/deleting logical blocks in a doubly linked list.

A logical block in which the record of the number of the previous block (located at the beginning of the block) is equal to the number of the first logical block, i.e. indicates the boot sector, is the root block.

There may be multiple such blocks on the physical media, indicating root block backups to improve reliability and restore the integrity of the file system in the event of a failure.

A logical block in which the record of the number of the previous block is equal to the number of the logical block itself, i.e. points to itself, is the initial logical block of the node itself.

A logical block in which the record of the next block number is equal to the number of the logical block itself, i.e. points to itself, is the terminating block of the node.

A logical block that does not have a write to the previous block is considered free (not occupied). For logical blocks that have been damaged, in the header of the root node (not to be confused with the root logical block), an entry is formed according to the specification of the list of bad blocks, both single and a range of logical blocks.

For logical blocks that were freed as a result of moving/deleting logical blocks in a doubly linked list, an entry is formed in the header of the root node (not to be confused with the root logical block) according to the specification of the list of freed blocks, both single and range of logical blocks.

Due to the fact that the root node—an element of the file system has a header describing the type of the file system element in ASN.1 with PER encoding, which in turn makes the file system flexible and functional, and on the other hand indicates the disadvantage—a complex coding process and decoding the header itself, to quickly find system nodes, the mechanism of using the system UGUID to find system components (system nodes) is used. For this, in the final logical block of the root node, space is allocated for the address of the logical block of the first system component of this information carrier. Namely, after the initial record (the number of the previous block and the number of the next block), the address follows—the number of the logical block of the first system component located on the physical medium.

Figure 7:
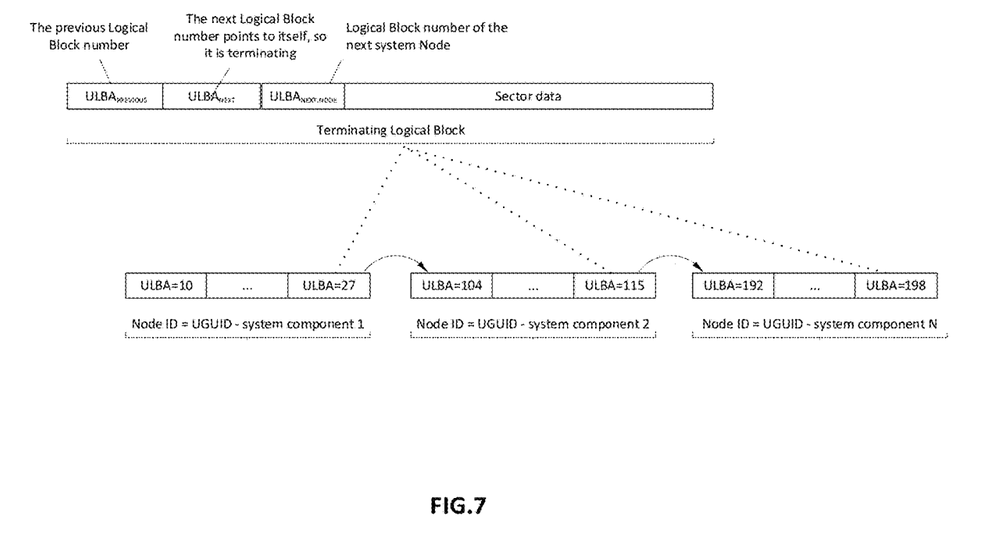
FIG. 7 illustrates a linked list of related nodes (system components)

In the final logical block of the first system component of FIG. 7, the address is the logical block number of the second system component, and so on. In this case, the node ID corresponds to the UGUID of the system component. The header of this node can be empty or encoded according to the specification and at the same time can be ignored, i.e. not be decoded, since a doubly linked list of logical blocks is a system component containing in the final logical block of the node the address-number of the logical block of the next system component (system node), which in turn facilitates the implementation of the operating system bootloader for finding and loading system components.

All information about the node type, its properties is encoded in the header. The header is binary data encoded with PER according to the ASN.1 specification.

As a result of using ASN.1 and PER encoding, the header becomes a versatile tool, it may include tens of hundreds of pages of the header description (specification), constantly expand, customize, while maintaining backward compatibility and at the same time be encoded only into the data size for which there is information that favorably distinguishes the claimed solution from other file system formats known from the prior art, where header data fields are rigid structures and usually also include Reserved fields.

The header defines the type of node, which is described in the specification—it can be a volume, directory, file, link, device, database, user node, which in turn gives flexible options for using the file system and its development. In addition, depending on the type of node, the header may include other specifications, such as the ITU-T X.509 standard.

The header is not fixed in size and can be expanded by inserting additional logical blocks into the doubly linked list of logical blocks of the node.

As a result of working with the file system—deleting, moving, inserting data on a physical medium, missing or damaged logical blocks (sectors) are formed, data about these logical blocks, both single and range, are stored in the header of the root node.

Information about incomplete logical blocks, i.e. logical blocks that are not completely filled with data that may result from an insert operation are also stored in the header of the node to which these logical blocks refer.

The file system can contain multiple root nodes that are backups of the primary root node. Information about the main root node, its initial logical block converted to CHS format, can be written to the partition table of the MBR, the partition type code must correspond to 0xE0h (ACOM architecture OS), information about backups of the root can be written to the remaining free partitions node.

In case of damage to the root node or individual nodes of the file system and there are no backups of the root node, a simple sequential scan of logical blocks based on the initial record in the logical block allows you to find nodes—chains of doubly linked lists, and when decoding the node header, determine the type of node and its relationship: parent, child nodes, thereby restoring the file system hierarchy.

If the node header cannot be decoded, then the node is considered damaged.

If, during recovery, nodes were found whose parent node was damaged and the integrity of the hierarchy was violated, then the decision to attach to the root node or create a new parent node for the found nodes is left to the user through the interface of the file system restore utility.

Figure 8:
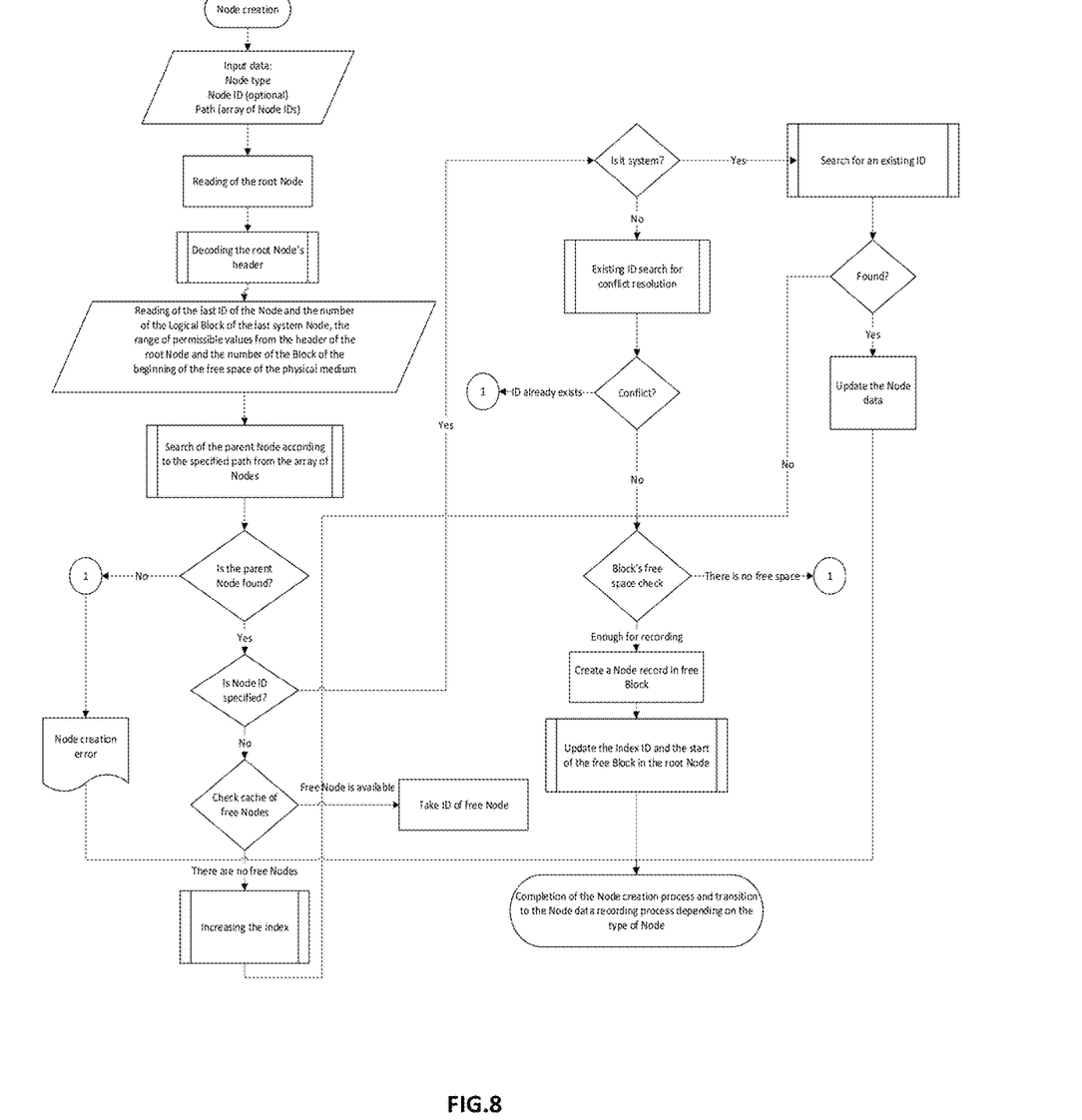
FIG. 8 illustrates a block diagram for creating a new node.

FIG. 8 is a block diagram of the creation of a file system node. This algorithm can be used by a file manager or by utilities to work with the disclosed file system.

When creating a file system node, the input data are the node type, the path to the new node, which is an array of node IDs or directory names for the classic view, and auxiliary parameters depending on the type of node being created. For example, if the node type is a directory, then the auxiliary (optional) parameters are the directory name, policy attributes, possibly a password, if access to the directory is assumed by a password, the encryption algorithm used, etc.

If it is supposed to create a node for a system component, the required input parameter is the component identifier UGUID, to check the uniqueness of the identifier of the created node.

Since the node identifier in this case will coincide with the component identifier, it is not allowed within the same tree of the file system hierarchy to have the same node identifiers, all node identifiers must be unique.

After determining the input data, the root node is read, followed by decoding of its header.

From the header of the node, information about sibling and child nodes is determined, based on the information on the nodes, the parent node for the new node is searched for.

Finding a parent node is accompanied by reading and decoding nodes according to the path to create a new node.

The search can be performed both by the node ID and by the classic symbolic path, while it should be borne in mind that parent nodes can have child nodes with the same names, the path to such nodes must include an additional representation, such as an index (example: . . . \FooName [1], . . . \FooName [2], . . . \FooName [3]).

In the absence of names, the view will look like, for example: . . . \ NoName [1], . . . \NoName [2], . . . \\NoName [3].

After a successful search for a parent node, it is determined whether a system node needs to be created. If no node ID is specified, a new node with a new ID is created.

The node ID is formed by simply incrementing the index from the range of valid values or taken from the cache of free node IDs resulting from the deletion.

If the input data is the creation of a system node, the node ID and the address of the last logical block of the linked list of system components are specified, then the existing node ID is searched for. If the node is found, the system component is overwritten (updated); otherwise, a new system node with the specified ID is created, in this case, the node ID is equal to the UGUID of the component.

The process of creating a new node is accompanied by a check for the presence of free logical blocks (the size of free space on the storage medium) sufficient to accommodate the node.

In the present application materials, the preferred disclosure of the implementation of the claimed technical solution was presented, which should not be used as limiting other, particular embodiments of its implementation, which do not go beyond of the claimed scope of legal protection and are obvious to specialists in the relevant field of technology.

The invention claimed is:

1. A computer-implemented method for building a file system based on hierarchy of nodes, performed using a computing device, the method comprising:
   formatting a physical medium or its partition by creating an initial root node of the file system, which is assigned a unique identifier (ID), wherein a record is formed in the root node, the record comprising quantity, size and addressing of logical blocks (LBA) of the physical medium;
   wherein based on information contained in the root node, the formatted physical medium or its partition is checked for availability of free logical blocks, sufficient for expanding existing nodes or placing a new node; and
   creating a new node of the file system comprising a unique identifier, an Abstract Syntax Notation One (ASN.1) header with Basic Packed Encoding Rules (PER) encoding and a doubly linked list of logical blocks of data of the new node by performing actions comprising:
   based on input data, including type of the new node, a parent node is searched for by traversing a tree of nodes of the file system with decoding of node headers, where encoding has been applied;
   determining whether the new node is of a special type having requirements for additional processing, and when the special type is confirmed, applying the additional processing; and
   when the ID of the new node is not specified, creating a node with a new ID, and when the ID of the new node is specified, searching for this node and after finding the node, performing node overwriting, updating, or creating a new node with the specified ID.

2. The method according to claim 1, wherein the unique identifier of a node of the file system is of Unlimited Integer format and consists of two parts: a preamble and an Integer.

3. The method according to claim 1, wherein the file system is hierarchical and has a tree structure.

4. The method according to claim 1, wherein nodes of a special type can be system component nodes, whose unique identifiers correspond to unique Unlimited Globally Unique Identifiers (UGUIDs) of operation system components and which form a linked list on the file system.

5. The method according to claim 1, wherein the ASN.1 header of a node does not have a fixed size and is expandable.

6. The method according to claim 1, wherein header includes new, user-defined types of a node, and the node contains data of the corresponding type.

7. The method according to claim 1, wherein node of a directory type may contain other nodes of the directory type and nodes of a file type having the same names.

8. The method according to claim 1, wherein each logical block used by a node has a record of number of the previous logical block and number of the next logical block for organizing the doubly linked list, thereby making possible to create, insert, move or delete logical blocks in the doubly linked list.

9. The method according to claim 1, wherein logical block, in which record of number of the previous logical block is equal to the number of the logical block itself, whereby the logical block points to itself as previous block, is an initial logical block of the node.

10. The method according to claim 1, wherein logical block, in which record of number of the next logical block is equal to the number of the logical block itself, whereby the logical block points to itself as next block, is a terminating logical block of the node.

11. A non-transitory computer readable data storage medium, comprising instructions for building a file system based on hierarchy of nodes, the instructions, when performed by a computing device, performing operations comprising:
  formatting a physical medium or its partition by creating an initial root node of the file system, which is assigned a unique identifier (ID), wherein a record is formed in the root node, the record comprising quantity, size and addressing of logical blocks (LBA) of the physical medium;
  wherein based on information contained in the root node, the formatted physical medium or its partition is checked for availability of free logical blocks, sufficient for expanding existing nodes or placing a new node; and
  creating a new node of the file system comprising a unique identifier, an Abstract Syntax Notation One (ASN.1) header with Basic Packed Encoding Rules (PER) encoding and a doubly linked list of logical blocks of data of the new node by performing actions comprising:
  based on input data, including type of the new node, a parent node is searched for by traversing a tree of nodes of the file system with decoding of node headers, where encoding has been applied;
  determining whether the new node is of a special type having requirements for additional processing, and when the special type is confirmed, applying the additional processing; and
  when the ID of the new node is not specified, creating a node with a new ID, and when the ID of the new node is specified, searching for this node and after finding the node, performing node overwriting, updating, or creating a new node with the specified ID.

12. The non-transitory computer readable data storage medium according to claim 11, wherein unique identifiers of the file system's nodes are prefixed with an identifier of a computer medium reader device.

13. A system, comprising:
  at least one processor;
  at least one memory, containing machine-readable instructions that, when executed by the at least one processor, are effective in executing a file system based on hierarchy of nodes built by performing operations comprising:
  formatting a physical medium or its partition by creating an initial root node of the file system, which is assigned a unique identifier (ID), wherein a record is formed in the root node, the record comprising quantity, size and addressing of logical blocks (LBA) of the physical medium;
  wherein based on information contained in the root node, the formatted physical medium or its partition is checked for availability of free logical blocks, sufficient for expanding existing nodes or placing a new node; and
  creating a new node of the file system comprising a unique identifier, an Abstract Syntax Notation One (ASN.1) header with Basic Packed Encoding Rules (PER) encoding and a doubly linked list of logical blocks of data of the new node by performing actions comprising:
  based on input data, including type of the new node, a parent node is searched for by traversing a tree of nodes of the file system with decoding of node headers, where encoding has been applied;
  determining whether the new node is of a special type having requirements for additional processing, and when the special type is confirmed, applying the additional processing; and
  when the ID of the new node is not specified, creating a node with a new ID, and when the ID of the new node is specified, searching for this node and after finding the node, performing node overwriting, updating, or creating a new node with the specified ID.

14. The system according to claim 13, wherein:
  the system is interconnected with one or more similarly-built systems, and
  wherein the system and the one or more similarly-built systems form a data storage system including a plurality of computing nodes, each of which has access to a plurality of storage mediums to access and process file system object data.

15. The system according to claim 14, wherein unique identifiers of nodes of the system and the one or more similarly-built systems are prefixed with identifiers thereof.

16. The method of claim 1, wherein unique identifiers of file system's nodes (IDs) are prefixed with an identifier of storage hardware used.

17. The system according to claim 14, wherein the system and the one or more similarly-built systems have access to a plurality of storage mediums to access and process file system data.

* * * * *